Patented Aug. 16, 1932                                                   1,871,895

UNITED STATES PATENT OFFICE

EMIL LÜSCHER, OF BASEL, SWITZERLAND, ASSIGNOR TO THE FIRM: LONZA ELEKTRIZITÄTSWERKE UND CHEMISCHE FABRIKEN AKTIENGESELLSCHAFT, OF GAMPEL AND BASEL, SWITZERLAND

NITROPHOSPHATES

No Drawing. Application filed December 13, 1928, Serial No. 325,919, and in Switzerland December 22, 1927.

Nitrophosphates which constitute remarkable fertilizers are in themselves hygroscopic, and generally the more so the more calcium nitrate and the more water-soluble phosphates they contain. Whilst, however, other equally hygroscopic fertilizers, for example, lime saltpetre, can be spread fairly easily, because the hard grains after water absorption are only surrounded with a thinly flowing solution, this is not the case with ordinary nitrophosphates. When spreading by hand the nitrophosphate grains easily stick to the hand, and this is without doubt because the solution produced by water absorption forms with filling substances and with phosphoric acid (or water-soluble phosphates) a sticky mass capable of easily sticking to the hand.

It has now been observed that the material to be spread is more sticky the greater the surface of its particles or grains relative to its mass, or the more porous or finer the grain.

Spreading hygroscopic fertilizers by hand naturally causes difficulties, because there is always a high degree of moisture on the surface of the hand. Moreover caking together of the material can easily occur owing to the raised temperature at the surface of the hand. When spreading by hand, therefore, the material to be spread will be more sticky the greater the surface of its particles which comes into contact with the hand.

The spreading properties of nitrophosphates can therefore be improved by reducing the contact surfaces of the nitrophosphate grains which contact with the surface of the hand when spreading. This object can be attained according to the present invention in the following manner: First, it has proved suitable to separate the finest powder from the nitrophosphates, for example by sieving. Then the nitrophosphate grains are mixed with an additional dry pulverulent non-hygroscopic substance and this mixture is briefly heated to temperatures at which the surface of the nitrophosphate grains becomes softened so as to cause said additional substance to adhere thereto. Thus, after cooling the strongly adhering additional substance forms a more or less coherent thin protective shell on the nitrophosphate grains which prevents to a great extent a caking together of the grains themselves as well as the sticking thereof to the hand, without, however, preventing access of the moisture of air to the nitrophosphate grains themselves.

What I claim is:

1. Process for improving the scatterability and stability of nitrophosphates comprising admixing the nitrophosphate in granular form with relatively small quantities of pulverulent non-hygroscopic substances, heating the mixture to a temperature at which superficial softening of the nitrophosphate granules takes place and simultaneously agitating the mixture, whereby the pulverulent particles are caused to positively adhere to the softened surfaces of the nitrophosphate granules and form a superficial thin coating thereon.

2. Process for improving the scatterability and stability of nitrophosphates comprising separating the smaller particles from the granules, admixing the latter with relatively small quantities of pulverulent non-hygroscopic substances, heating the mixture to a temperature at which superficial softening of the nitrophosphate granules takes place and simultaneously agitating the mixture, whereby the pulverulent particles are caused to positively adhere to the softened surfaces of the nitrophosphate granules in the form of a thin superficial cooling.

In witness whereof I have hereunto signed my name this 30th day of November, 1928.

EMIL LÜSCHER.